US005450469A

United States Patent [19]

Pamart et al.

[11] Patent Number: 5,450,469

[45] Date of Patent: Sep. 12, 1995

[54] SUBSCRIBER INTERFACE BOX

[75] Inventors: Oliver Pamart, Domont; Jean C. Pansanel, Herblay, both of France

[73] Assignee: The Whitaker Corporation, Wilmington, Del.

[21] Appl. No.: 271,682

[22] Filed: Jul. 7, 1994

[30] Foreign Application Priority Data

Jul. 30, 1993 [FR] France ................................ 93 09437

[51] Int. Cl.$^{6}$ ........................ H04M 1/24; H04M 1/00

[52] U.S. Cl. ........................................ 379/27; 379/399

[58] Field of Search ...................... 379/25, 26, 30, 332, 379/325, 399, 27

[56] References Cited

U.S. PATENT DOCUMENTS

| | | | |
|---|---|---|---|
| 4,426,125 | 1/1984 | Crawford | 339/99 |
| 4,438,303 | 3/1984 | Astier | 200/51.1 |
| 4,500,158 | 2/1985 | Dola | 339/122 R |
| 4,701,138 | 10/1987 | Key | 439/417 |
| 4,725,241 | 2/1988 | Bertini et al. | 439/188 |
| 4,729,738 | 3/1988 | Heng et al. | 439/395 |
| 4,793,823 | 12/1988 | Cozzens et al. | 439/409 |
| 4,969,836 | 11/1990 | Magnier et al. | 439/188 |
| 4,971,569 | 11/1990 | Gooch et al. | 439/188 |
| 4,995,829 | 2/1991 | Geib et al. | 439/409 |
| 5,030,123 | 7/1991 | Silver | 439/188 |
| 5,178,554 | 1/1993 | Siemon et al. | 439/188 |
| 5,291,553 | 3/1994 | Smith | 379/399 |
| 5,297,199 | 3/1994 | Graham et al. | 379/399 |
| 5,333,193 | 7/1994 | Cote et al. | 379/399 |

FOREIGN PATENT DOCUMENTS 2626124A 7/1989 France .

*Primary Examiner*—Stephen Chin
*Assistant Examiner*—Kevin Kim
*Attorney, Agent, or Firm*—Adrian J. LaRue; Mary K. Van Atten

[57] ABSTRACT

A subscriber interface box generally shown at comprises a network section and a subscriber section, the network section connected to a network cable and the subscriber section connected to subscriber cables and whereby the network and subscriber sections are electrically connected via a test socket. The subscriber interface box comprises lever members having cavities therethrough for receiving wires of the cables such that the wires can be rapidly connected and disconnected to insulation displacement contacts. The latter is done by placing the wires in corresponding holes of the lever members when the lever members are in an open position, whereby the lever members comprise slots transversely intersecting the wire receiving cavities. The slots for receiving upstanding insulation displacement contacts such that when the levers are pushed down to a close position the wires are forced into electrical contact with the IDC contact slots. Insertion of a test plug into the test socket resiliently biases contact arms that extend from the subscriber to the network section such that there is electrical disconnection therebetween and electrical connection of the network section to the testing plug stop.

16 Claims, 16 Drawing Sheets

SUBSCRIBER INTERFACE BOX

BACKGROUND OF THE INVENTION

1. Field of the Invention

This invention relates to a subscriber interface box for electrically connecting a telephone network cable to subscriber cables, and in particular a subscriber interface box having a separate network and subscriber section with a test socket therebetween.

2. Summary of the Prior Art

It is desirable in the telephone industry, to have a versatile and flexible wiring connection system between the network and the subscriber lines. Due to the number of electrical devices that are now connectable to the telephone system, for example telefax machine, telephone and answering machine, there is a need for rapid and easy connection of these devices to the network. The growing number of devices and the flexibility demanded by the subscriber has led the telephone companies to take responsibility of the public network, and the electrical devices become the responsibility of the subscriber. The telephone companies therefore only repair and maintain the network lines supplied right to the subscriber. If a fault occurs, one must therefore first be able to determine whether the fault lies on the network or on the subscriber side. In order to do this correctly one must disconnect the subscriber from the network side, because a short circuit on the subscriber side, for example, would influence a testing apparatus connected to the network cable at the subscriber box. There is therefore a need to provide a subscriber box having a network section and a subscriber section that can be electrically disconnected and only the network cables tested for faults.

In order to reduce installation and repair costs, especially considering the increasing number of devices to be connected, it is desirable to provide a subscriber interface box that has means to rapidly connect and disconnect the subscriber wires and network wires together, and in particular without requiring the use for special tools or skilled personnel.

SUMMARY OF THE INVENTION

It is therefore an object of this invention to provide a subscriber interface box for electrically connecting electrical devices to a network cable in a rapid, simple and reliable manner. It is a further object of this invention to provide a subscriber interface box having means for rapid and simple discovery of a fault on the network line.

An object of this invention has been achieved by providing a subscriber interface box having a subscriber section, a network section, a test socket for receiving a testing apparatus plug, and terminals, whereby the terminals electrically connect the network section to the subscriber section via the test socket such that insertion of the testing apparatus plug into the test socket electrically disconnects the network section from the subscriber section and electrically connects the testing apparatus to the network section.

A further object of this invention has been achieved by providing an interface box comprising movable stuffer levers having cavities for receiving wires of the cables, and slots transversely intersecting the cavities for receiving insulation displacement contacts of the terminals; the cavities being movable substantially adjacent slots of the contacts by activation of the lever such that wires inserted in the cavities are pushed into the contact slots for electrical connection therewith, respectively pulled out of the contact slots for electrical disconnection therewith.

DETAILED DESCRIPTION OF THE PREFERRED EMBODIMENT

Figure 1:
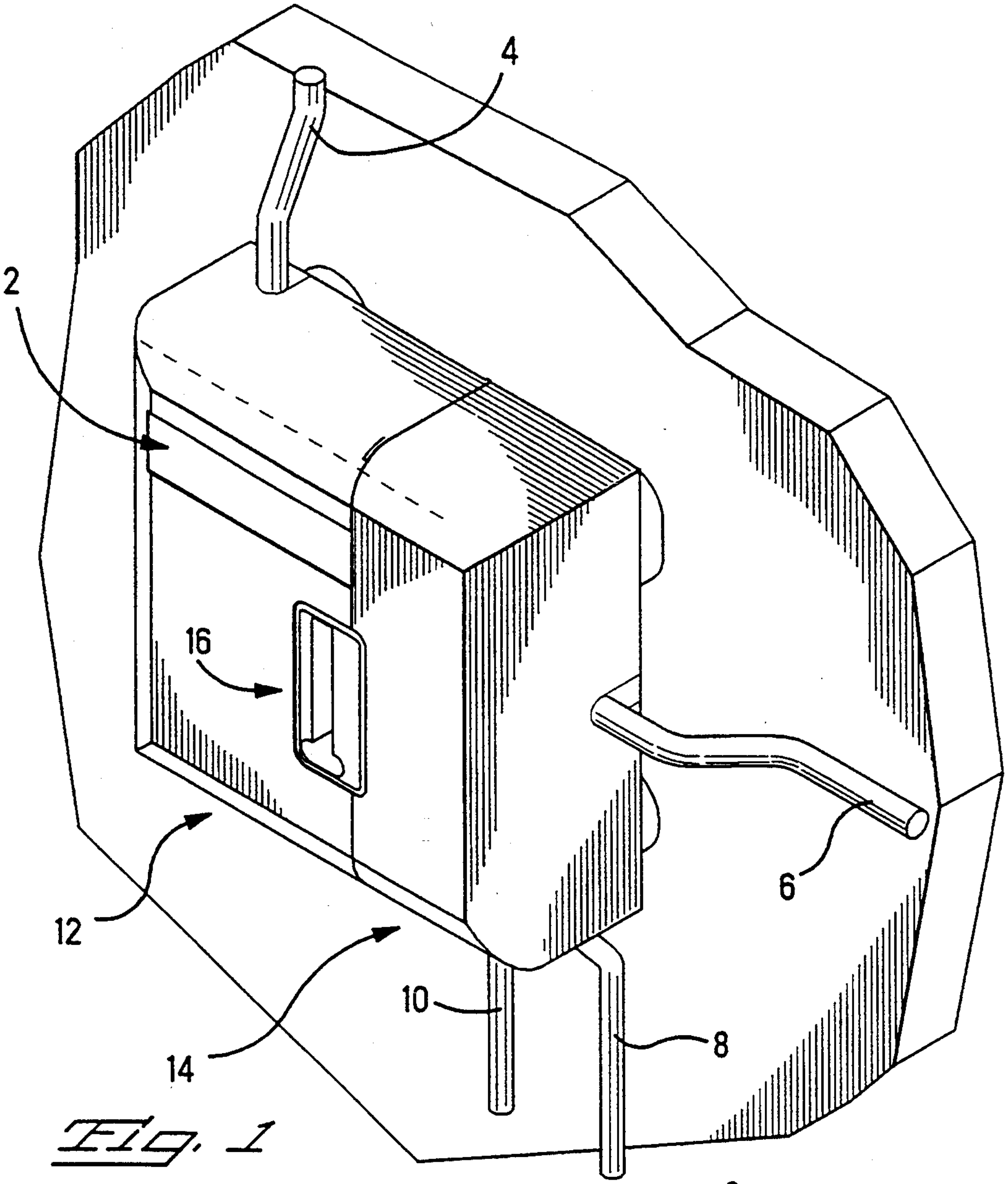
FIG. 1 is an isometric view of a subscriber interface box.

Referring to FIG. 1, a subscriber interface box is generally shown at 2 being connected to a telephone network cable 4, subscriber cables 6 and 8, and a grounding cable 10, the subscriber interface box comprising a network section 12, a subscriber section 14 and a test socket 16.

Figure 2:
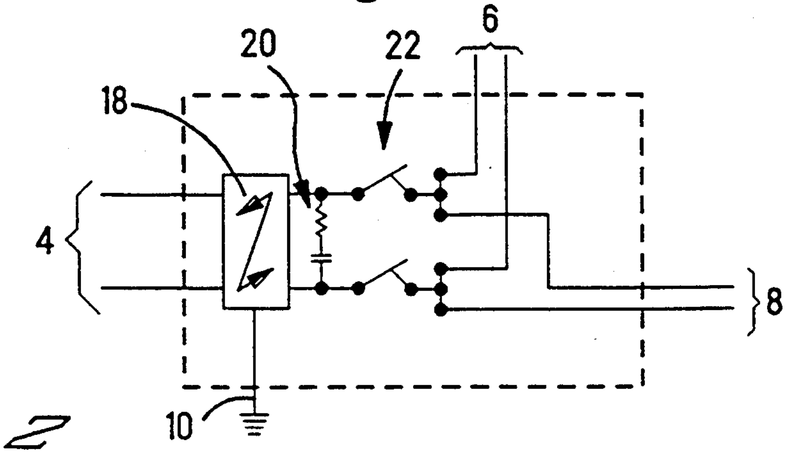
FIG. 2 is a schematic diagram of the electrical circuit of the subscriber interface box.

Referring now to FIG. 2, the schema of the electrical circuit that is required of the subscriber interface box is shown whereby the telephone network cable 4 is shown connected to a surge protector 18, a resistance-capacitance (RC) module 20, a test socket 22 and subscriber lines 6 and 8.

Figure 3:
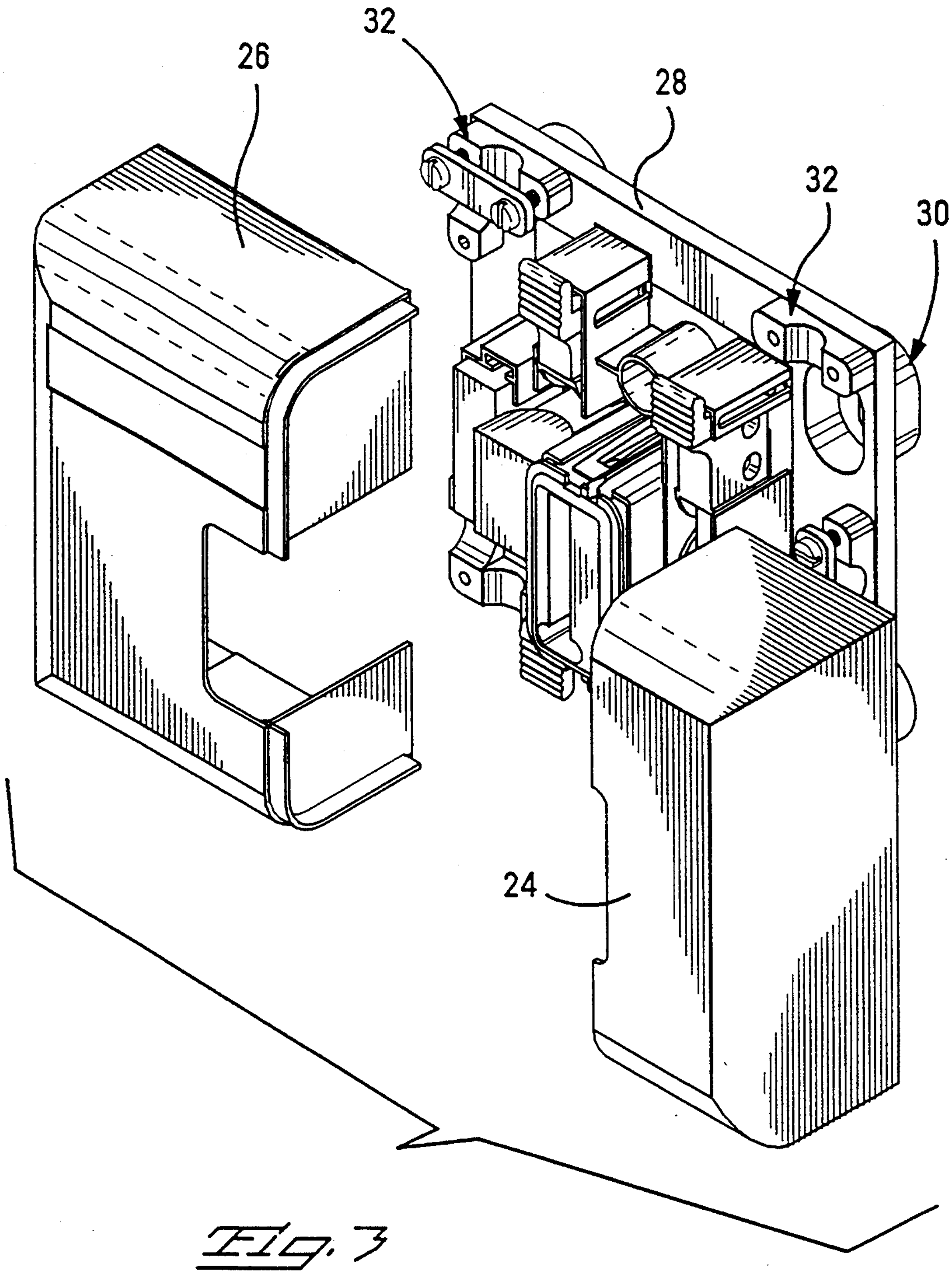
FIG. 3 is an isometric view of a subscriber interface box with the covers exploded away.

Referring to FIG. 3, the interface box is shown having cover means that comprise a subscriber cover part 24 and a network cover part 26 exploded away from a base 28 of the interface box, and also comprising wall mounting means 30 and cable strain-relief means 32.

Figure 4:
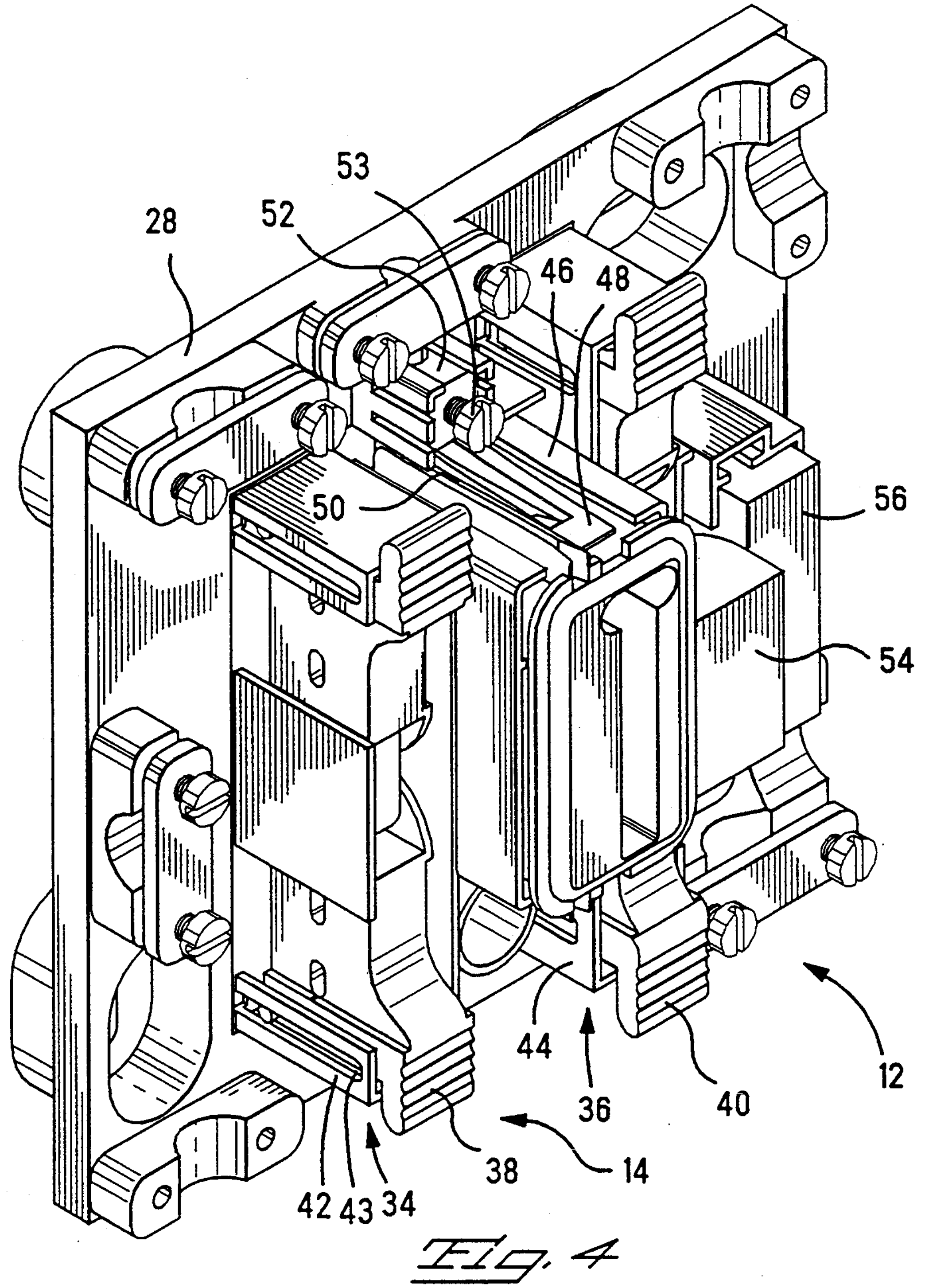
FIG. 4 is a more detailed isometric view of the subscriber interface box without covers.
Figure 5:
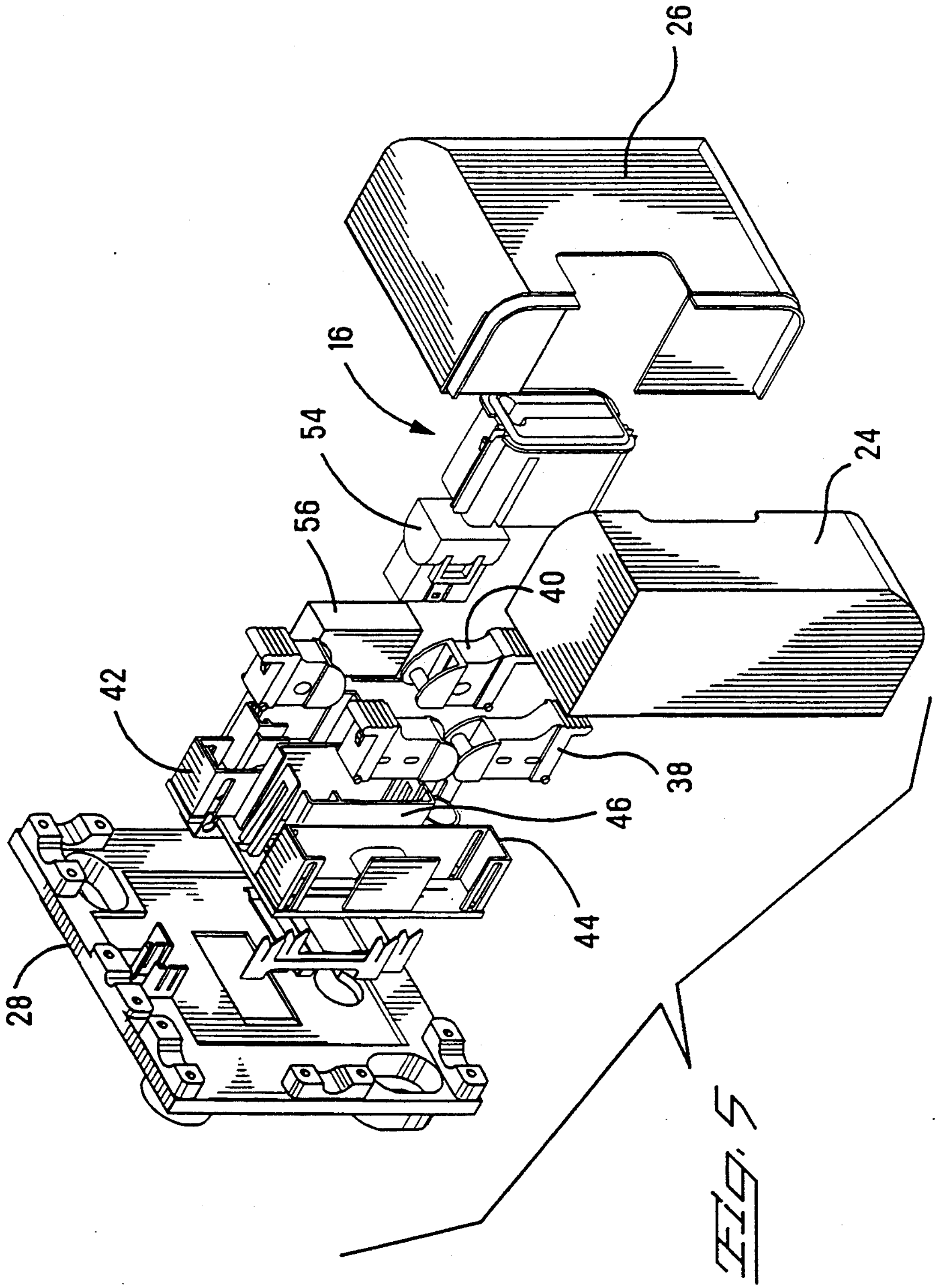
FIG. 5 is an exploded isometric view of a subscriber interface box.
Figure 6:
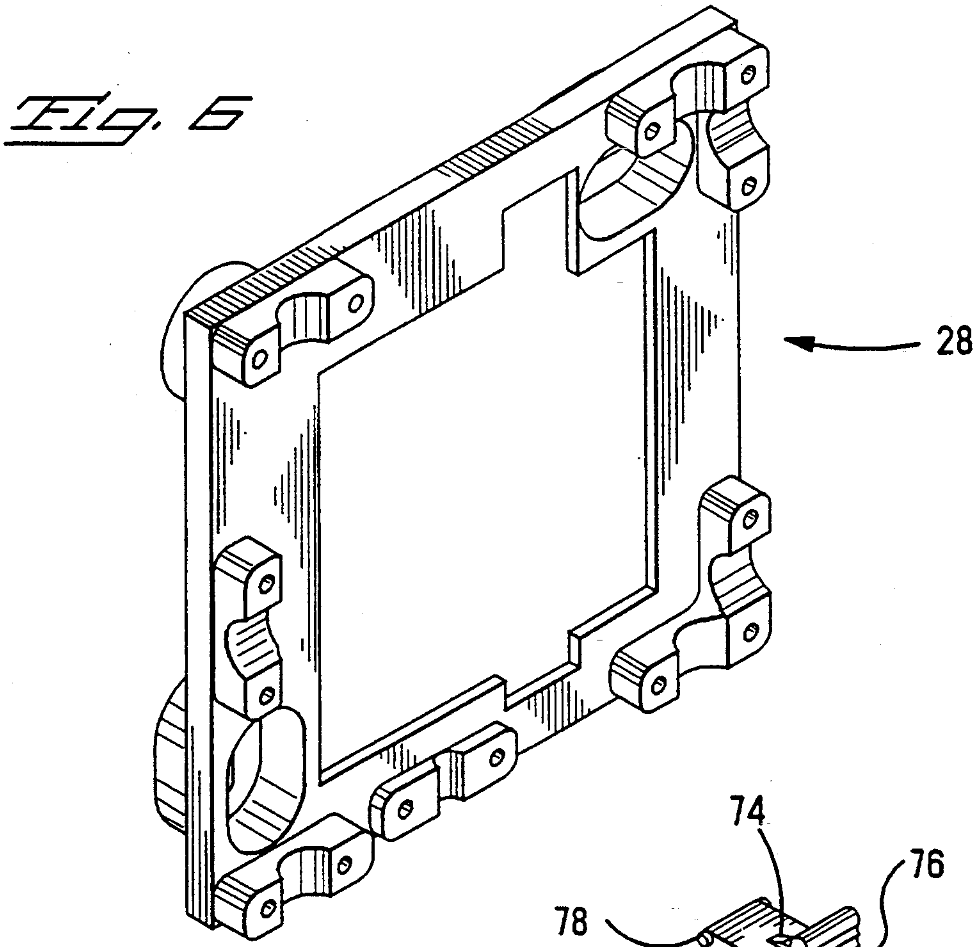
FIG. 6 is an isometric view of the base plate of the subscriber interface box.
Figure 7A:
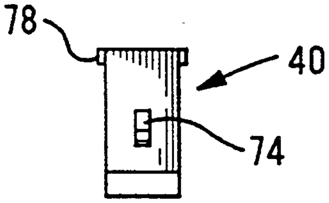
FIGS. 7*a* to 7*d* show different views of an insulation displacement lever mechanism for connecting network cables.
Figure 7B:
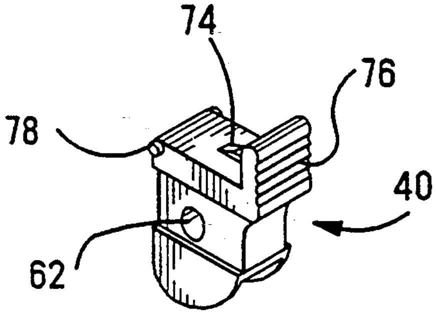
Figure 7C:
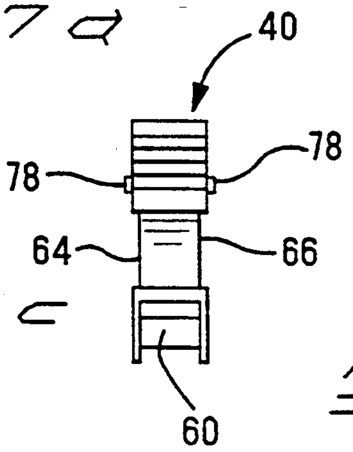
Figure 7D:
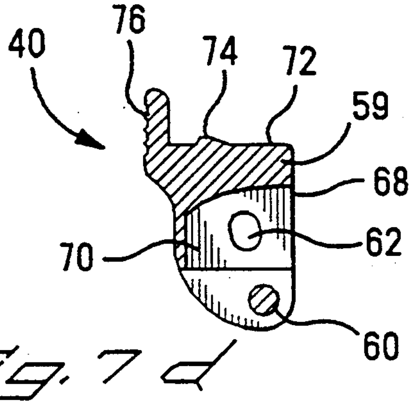

Referring to FIG. 4, wire connection mounting means generally shown at 34 and 36 are attached to the base 28 and comprise wire connection levers 38, 40 rotatably attached to component mounting frames 42, 44 respectively. Also attached to the base 28, is a mounting frame 46 comprising resilient latches 48 and a cover receiving slot member 50 for correctly mounting the cover 26 to the test socket 16 and to the base 28. Also shown, is a grounding block 52 for connecting wires of the grounding cable 4 to a grounding terminal. In the network section 12 is assembled a surge protector 54 and an RC-module 56.

Referring to FIG. 7, the network section lever member 40 is shown comprising a cylindrical pivot member 60 at a front section of the lever, and in a middle section is a wire receiving cavity 62 extending substantially parallel to the pivot member 60 between one side wall 64 and an opposing side wall 66 of the lever member 40. Between the outer side walls 64,66 and extending laterally thereto into the housing 59 from a bottom wall 68, is an insulation displacement contact receiving slot 70, the slot 70 transversely intersecting the wire receiving cavity 62. Perpendicularly to and adjacent the bottom wall 68 is a rear wall 72 comprising a retaining projection 74. Extending perpendicularly and rearwardly from the rear wall 72 at an opposing end to the bottom wall 68, is a finger activated grip 76. Projecting transversely out of the side walls 64,66 at a bottom rear corner of the lever member 40 are guide pegs 78.

Figure 10:
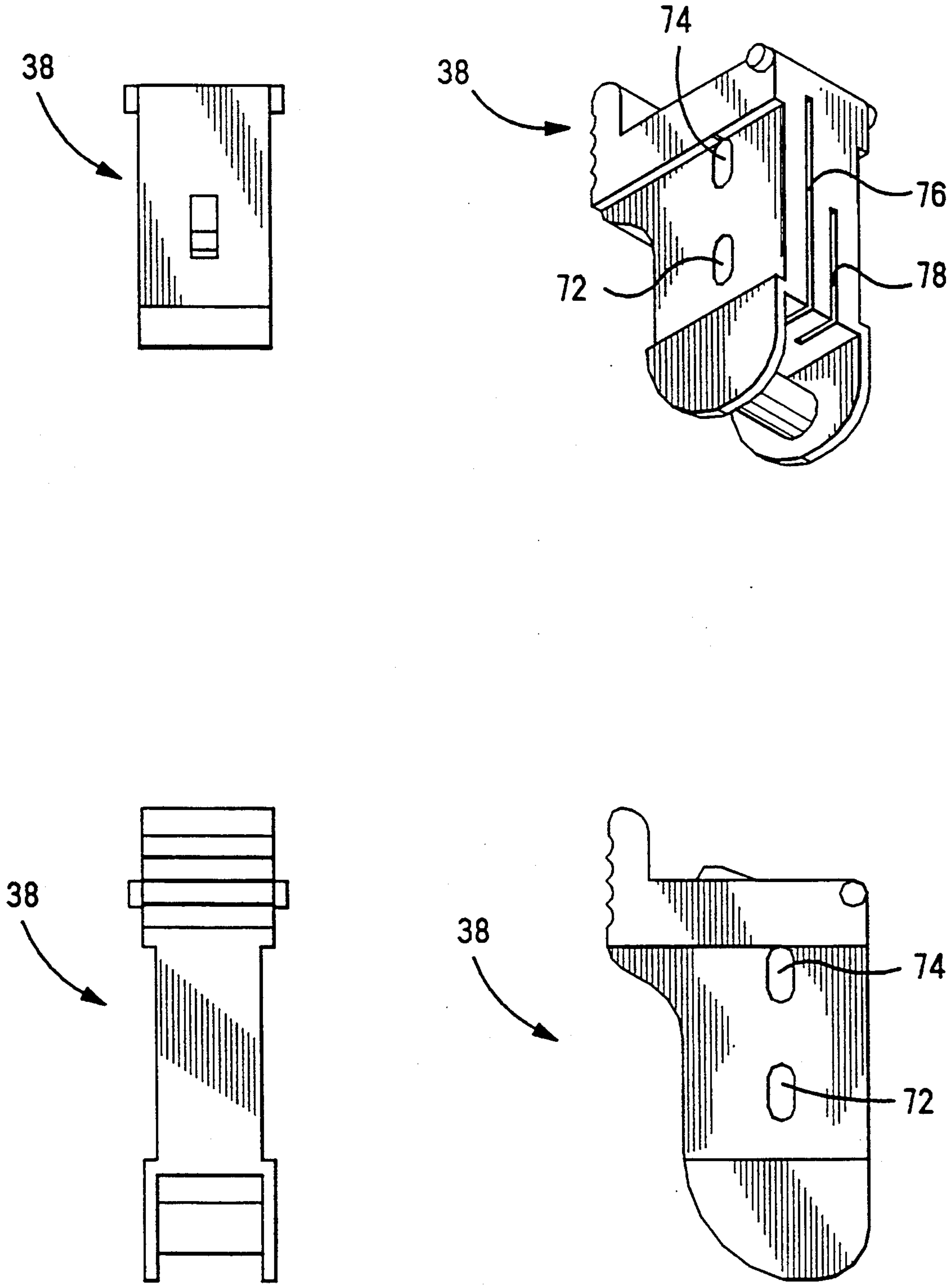
FIG. 10 shows different views of an insulation displacement lever for connecting subscriber cables.

Referring now to FIG. 10, a subscriber wire connecting lever member 38 is shown very similar to the network lever member 40 but comprising a few differences, namely two wire receiving cavities 72,74 and two insulation displacement contact receiving slots 76,78 whereby the slot 78 transversely intersects the cavity 72 and the slot 76 which is parallel to the slot 78 but spaced therefrom, intersects both cavities 72 and 74. Other features are very similar and denoted with the same numbering.

Figure 13:
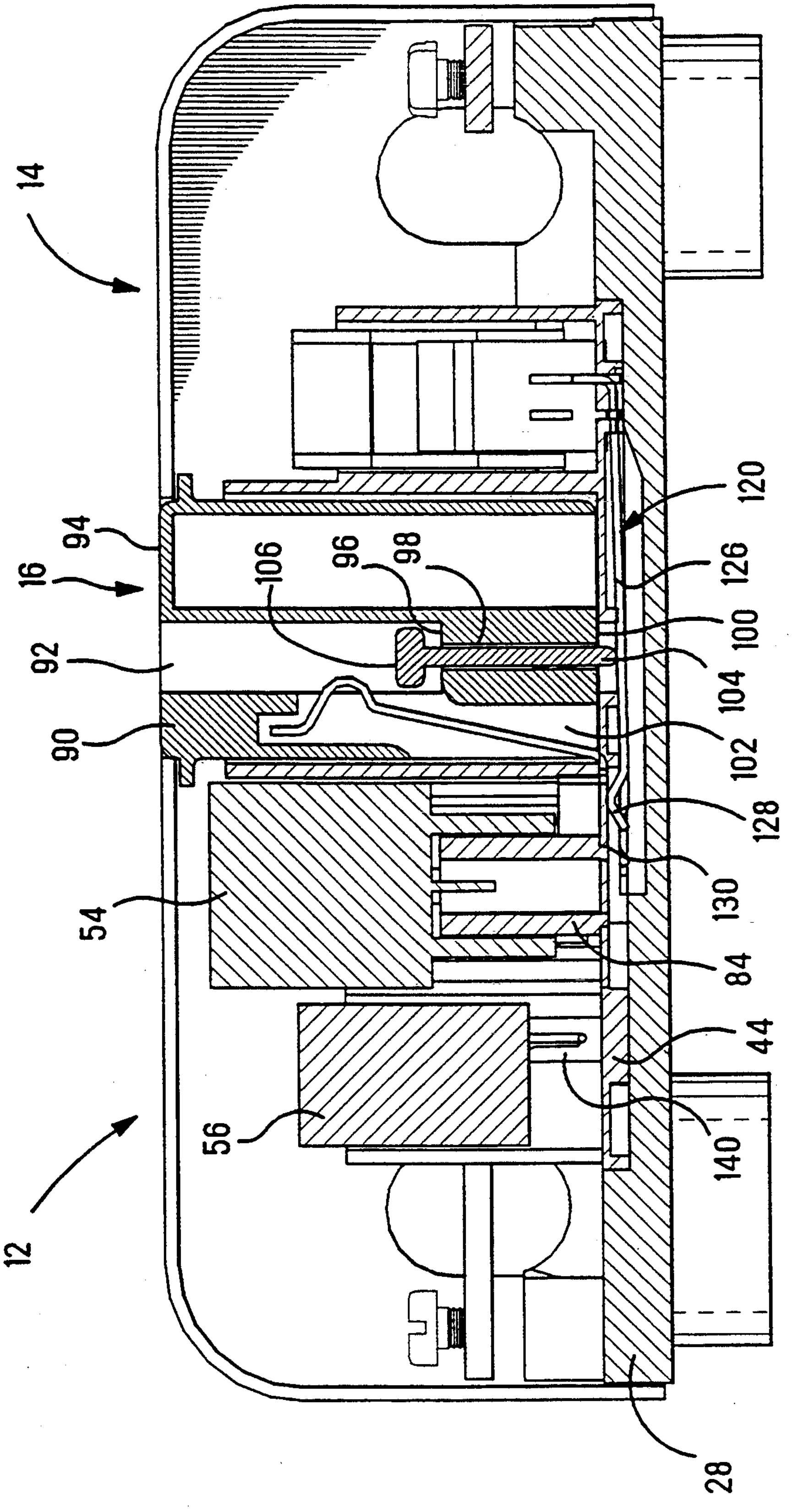
FIG. 13 shows a cross-sectional view through the subscriber interface box, showing in particular the test socket mechanism whereby contact between the subscriber section and the network section is made.
Figure 14:
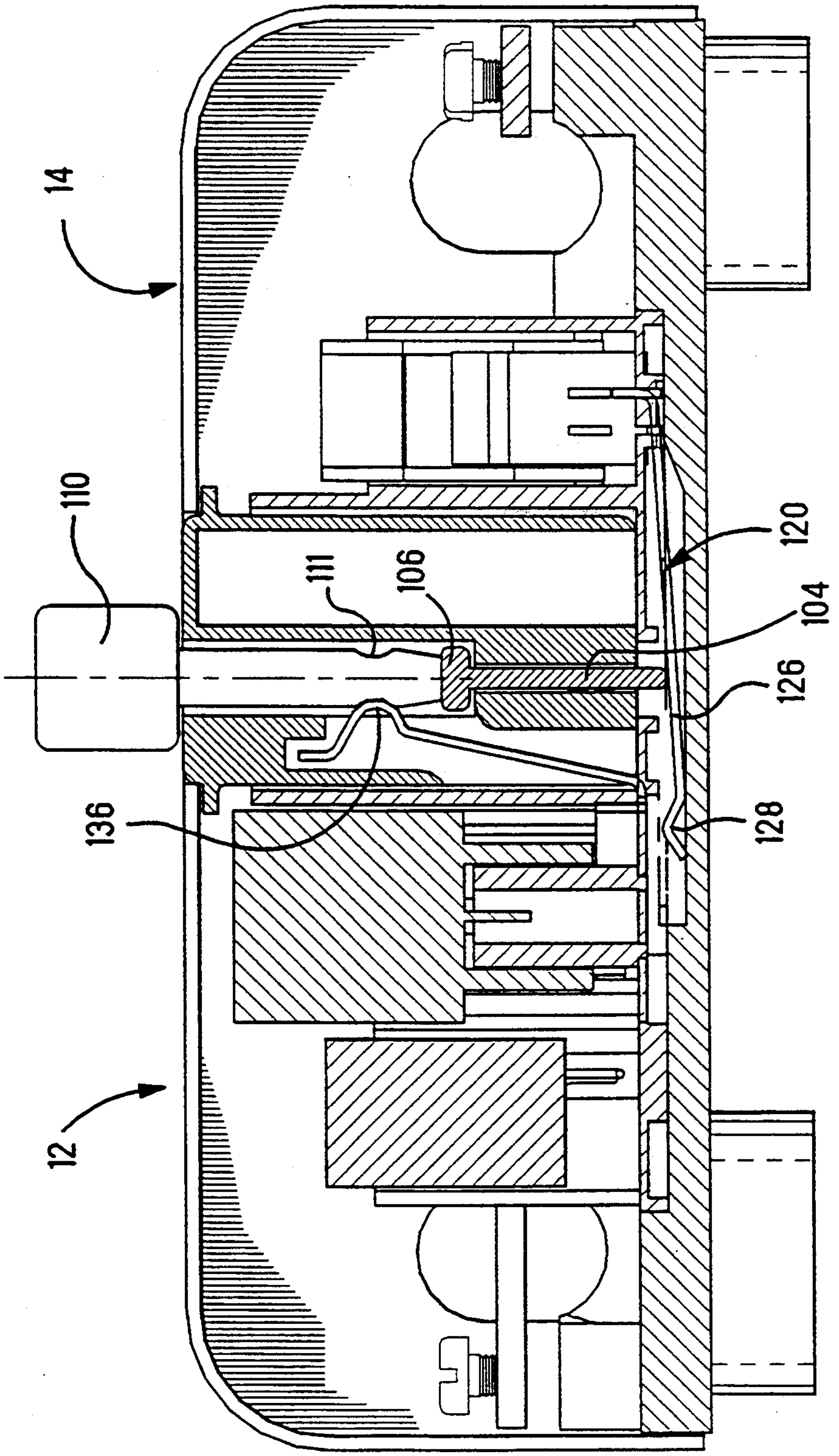
FIG. 14 is a view similar to FIG. 13 but with a test plug inserted into the test socket and the subscriber side disconnected from the network side.
Figure 16B:
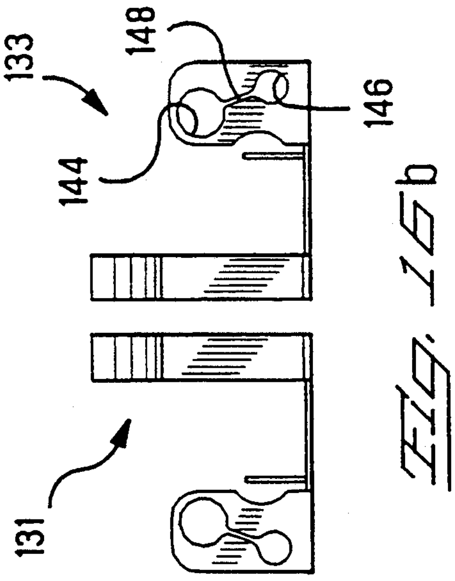
FIGS. 16*a* to 16*d* show the terminals that make electrical contact to the terminals of FIG. 15 and network cables, and that additionally make electrical contact to an electrical surge protector and a resistance-capacitance module.
Figure 16D:
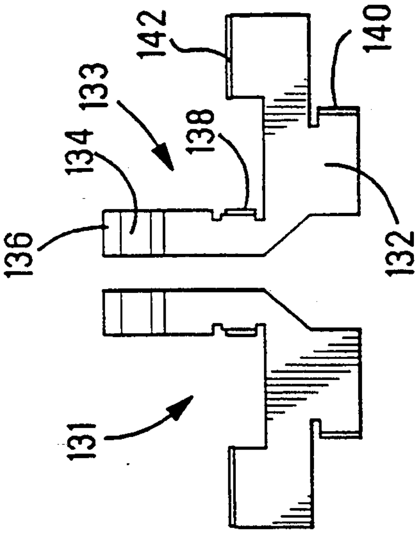
Figure 16A:
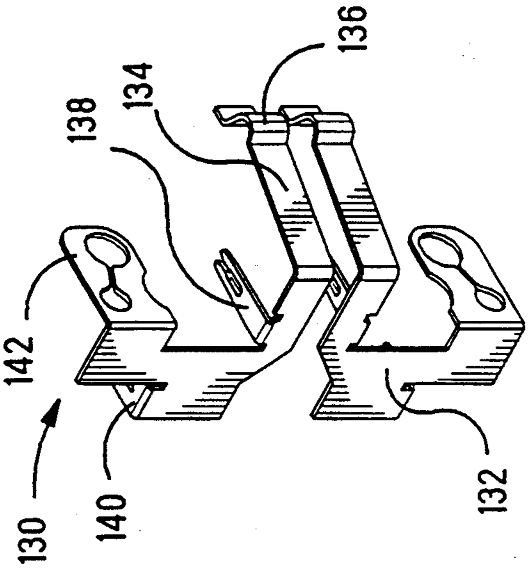
Figure 16C:
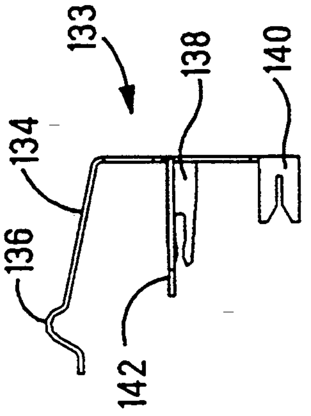

Referring to FIG. 12 and FIG. 13, the test socket 16 is shown in more detail comprising a housing 90, a test plug receiving cavity 92 extending from a mating face 94 to an inner bottom wall 96, an insert receiving cavity 98 extending from the inner bottom wall 96 to a socket bottom wall 100, and a contact receiving cavity 102 that extends from an outer wall of the test socket to the plug receiving cavity 92. A T-shaped disconnection insert 104 is positioned within the insert receiving slot 98 having a transverse top section 106 positioned in the plug receiving cavity 92. In FIG. 14, a test plug 110 is shown inserted in the cavity 92.

Figure 15:
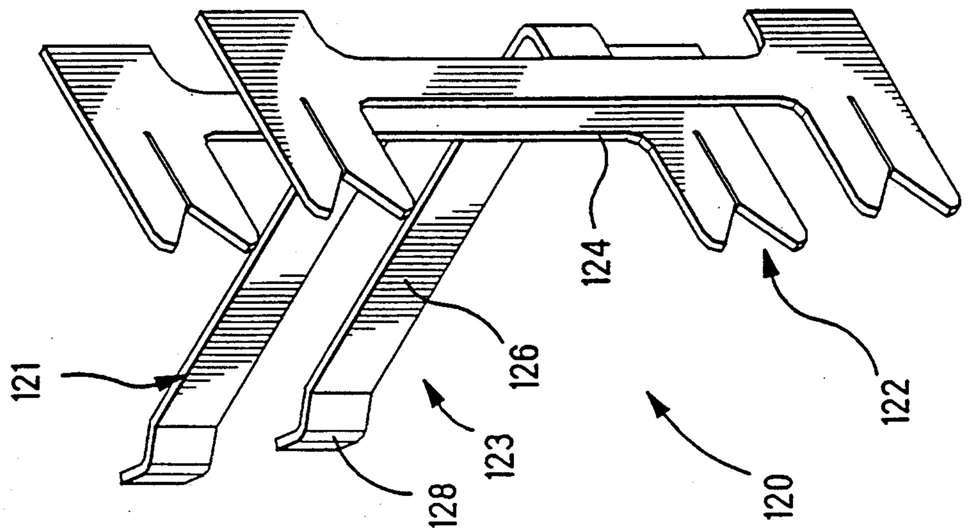
FIG. 15 is an isometric view of terminals that make electrical contact between the subscriber section and the test socket.

Referring now to FIG. 15, subscriber section terminals generally shown at 120 can also be seen in FIGS. 13 and 14 whereby the terminals 120 comprise each a pair of insulation displacement contact sections 122 separated by a spacer arm 124, and resilient arm sections 126 departing transversely of the arms 124 and attached approximately in the middle thereof, the resilient arms 126 comprising a bent V-shaped contact portion 128 at the other end of the resilient arm 126. As shown in FIGS. 13 and 14, the insulation displacement contact sections 122 are placed within the lever member slots 76, 78 respectively and the resilient arms 126 extend therefrom across the bottom face 100 of the test socket to a position in the network section 12 just below other corresponding terminals 130.

The network section terminals 130 can be best seen in FIG. 16 comprising a base portion 132 and attached to the base portion are resilient test socket contact arms 134 having arcuate contact portions 136, a fork shaped contact portion 138 for contacting the surge protector, a fork shaped contact portion 140 for contacting the RC-module; and an insulation displacement contacting portion 142 comprising a wire receiving hole 144, another hole 146 spaced therefrom, and extending therebetween a wire contacting slot 148.

Figure 17:
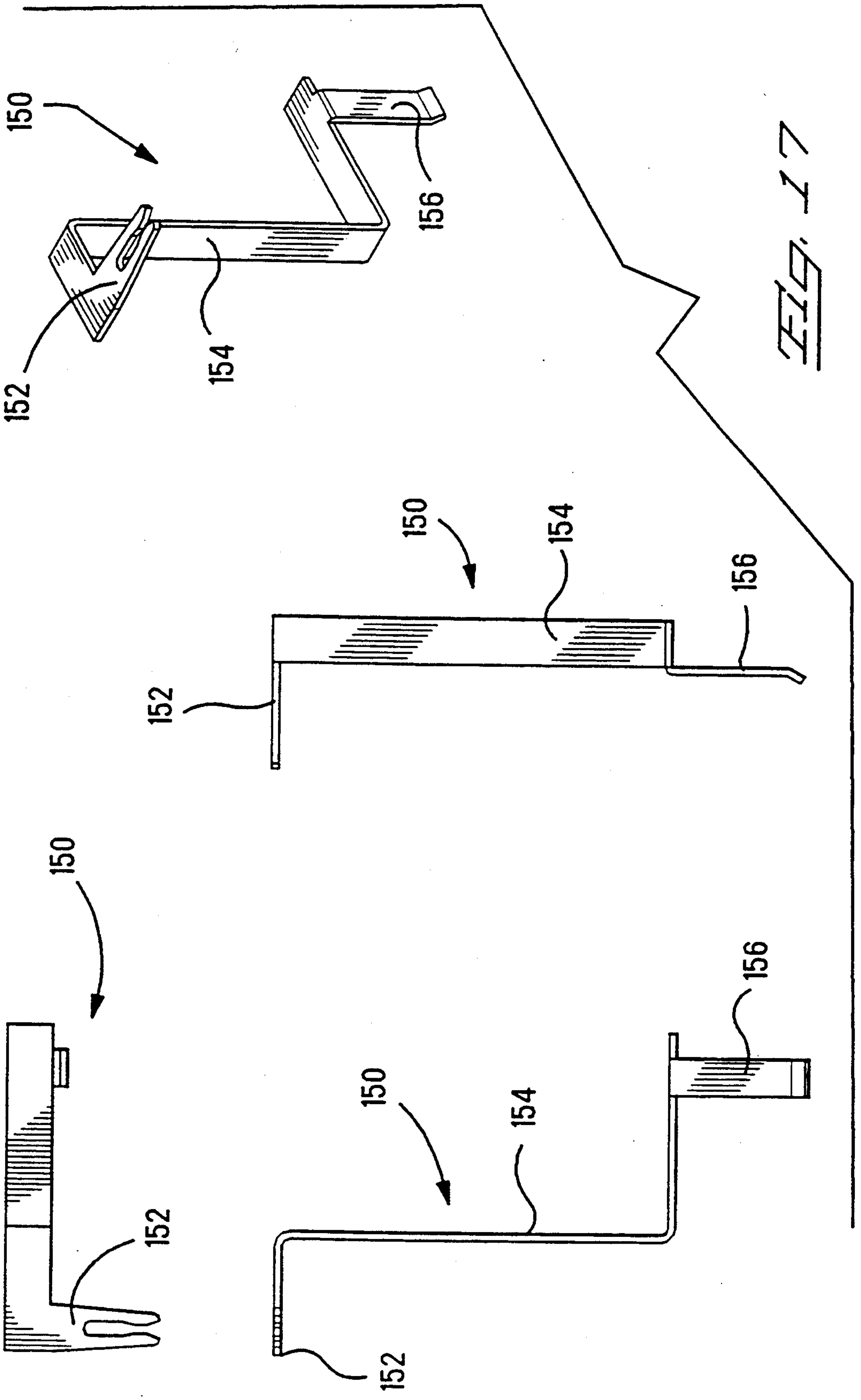
FIG. 17 shows different views of a ground terminals that makes electrical contact between a grounding cable and a ground pole of the surge protector.

Referring to FIG. 17, a grounding terminal 150 is shown comprising a fork shaped contacting section 152 attached to an L-shaped base arm 154, and to the other end is a contacting tongue 156.

Figure 9:
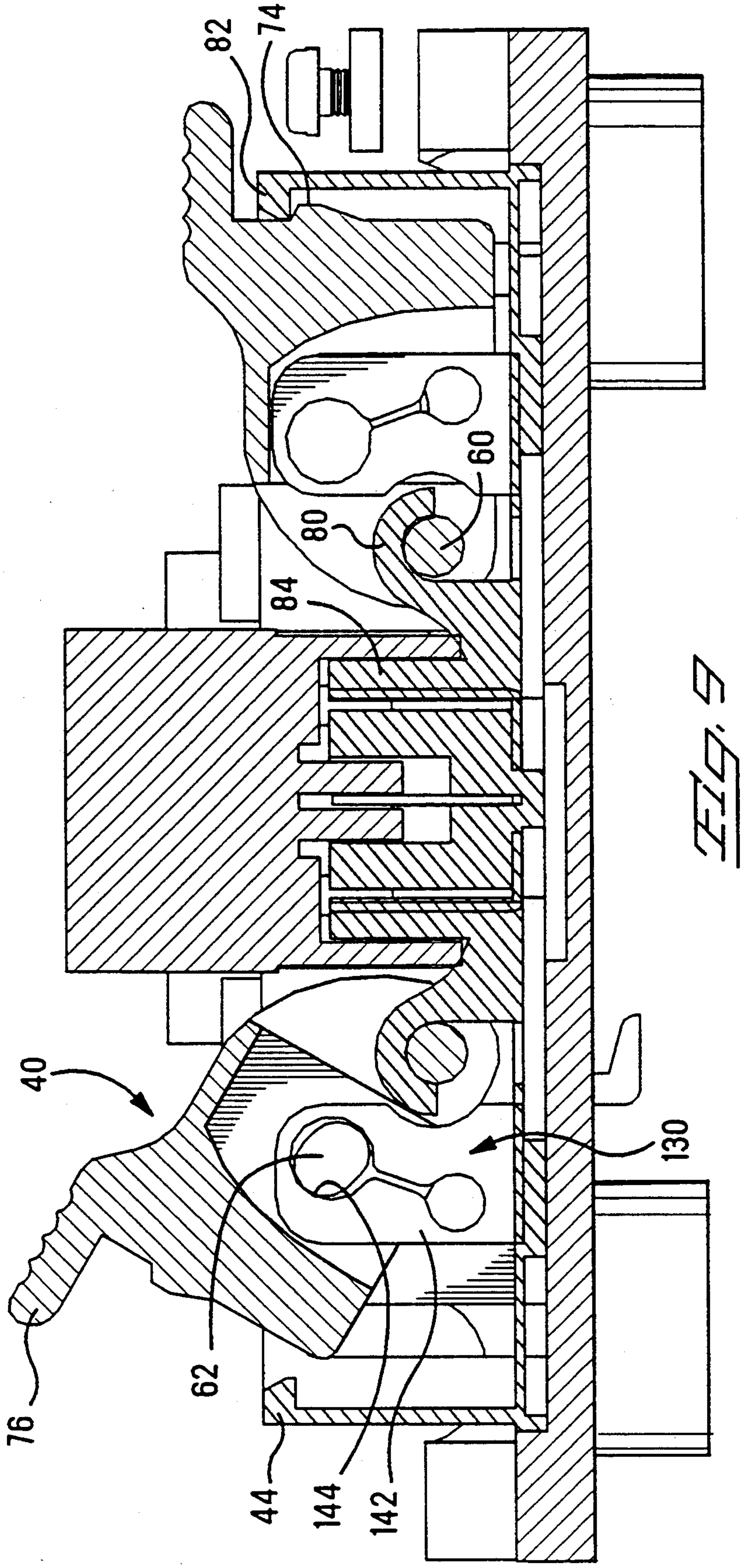
FIG. 9 is a cross-sectional view through the subscriber interface box showing in particular the insulation displacement contact mechanism.

Referring to FIG. 9, the network levers frame 44 is shown comprising a hook-shaped pivot bearing 80 that cooperates with the lever pivot member 60, a latching projection 82, and walls 84 that cooperate with the surge protector 54 for mounting thereof.

Figure 8:
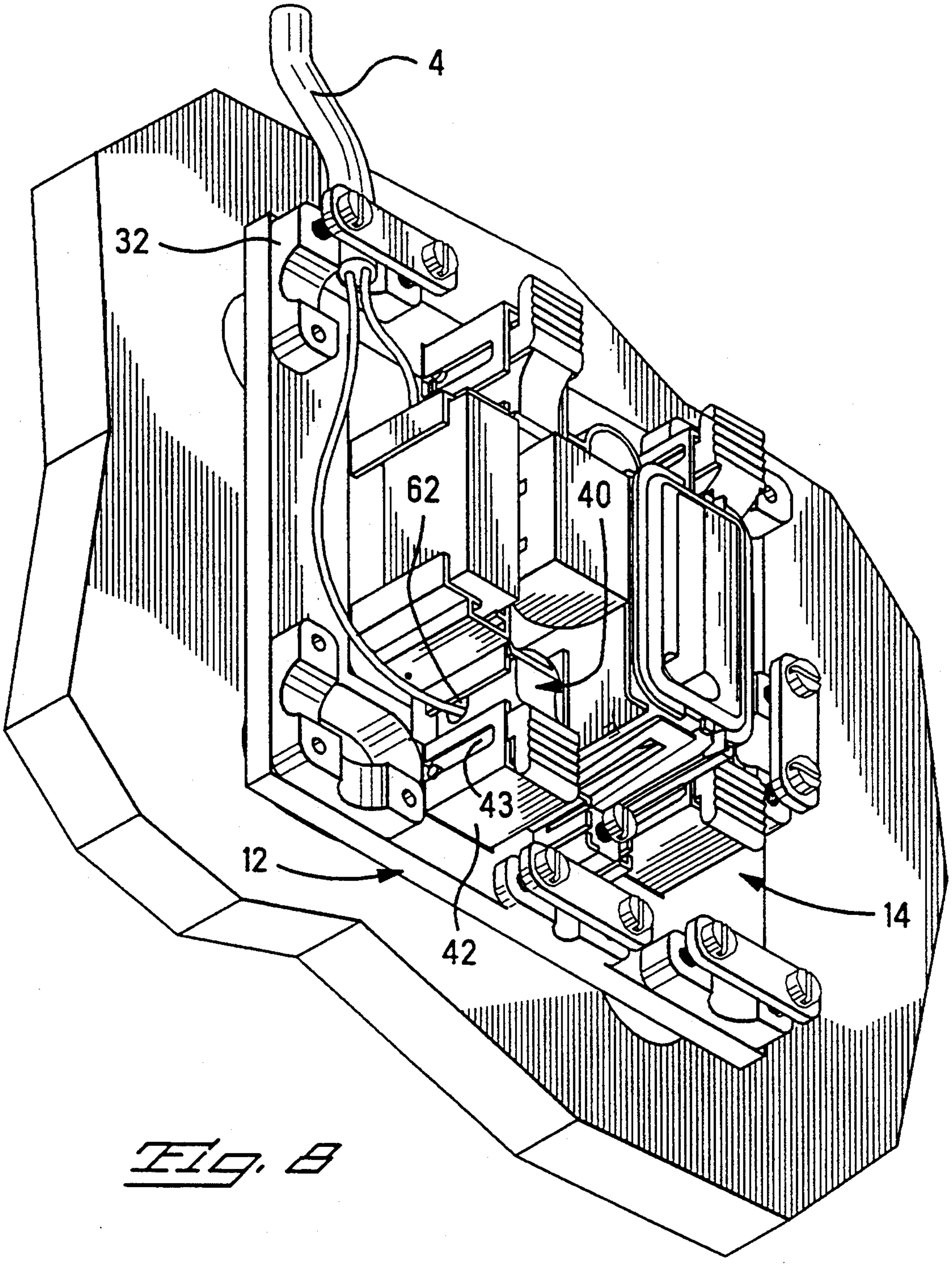
FIG. 8 is an isometric view of a subscriber box without cover showing network wires partially connected thereto.

Referring to FIGS. 8 and 9, the electrical connection of the network cable 4 to the electrical contacts 130 will now be described. The network cable comprises a pair of wires to be individually connected whereby each wire is fed through its corresponding wire receiving cavity 62 in the lever member 40 which are in the open position. The pivot member 60 of the lever 40 is rotatably held to the base 28 via the hook shaped pivot bearing 80, whilst the pegs 78 of the lever are located in the slots 43 of the frame 42 in order to assist guiding of the lever arm. The cavities 62 are located adjacent and in line with the wire receiving holes 144 of the network terminals 130 when the lever is in the open position such that the wires can be fed therethrough. Once the wires are fully inserted, the lever members 40 can be depressed manually by pushing down the fingered grip 76 until the projection 74 snaps behind the latching projection 82 of the frame. Simultaneously, the wire is forced into the insulation displacement contact (IDC) slot 148, the insulation thereby stripped off and the wire making electrical contact therewith. The holes 146 and 144 of the contact 142 also assist in increasing the flexibility that is required when the wire is forced into the slot 148. In order to disconnect the wire from the terminals 130, it suffices to simply lift up the grip 76 hence disengaging the lever projection 74 past the frame latching projection 82 until a fully opened position, whereby the wires are once again encircled by the hole 144 of the contacts 142 and the wires can thus be extracted from the contacts 142 and the lever members 40. Once the network wires have been connected to the terminal 130, the network cable 4 can be securely fixed to the subscriber base 28 by strain relief means 32.

Figure 11:
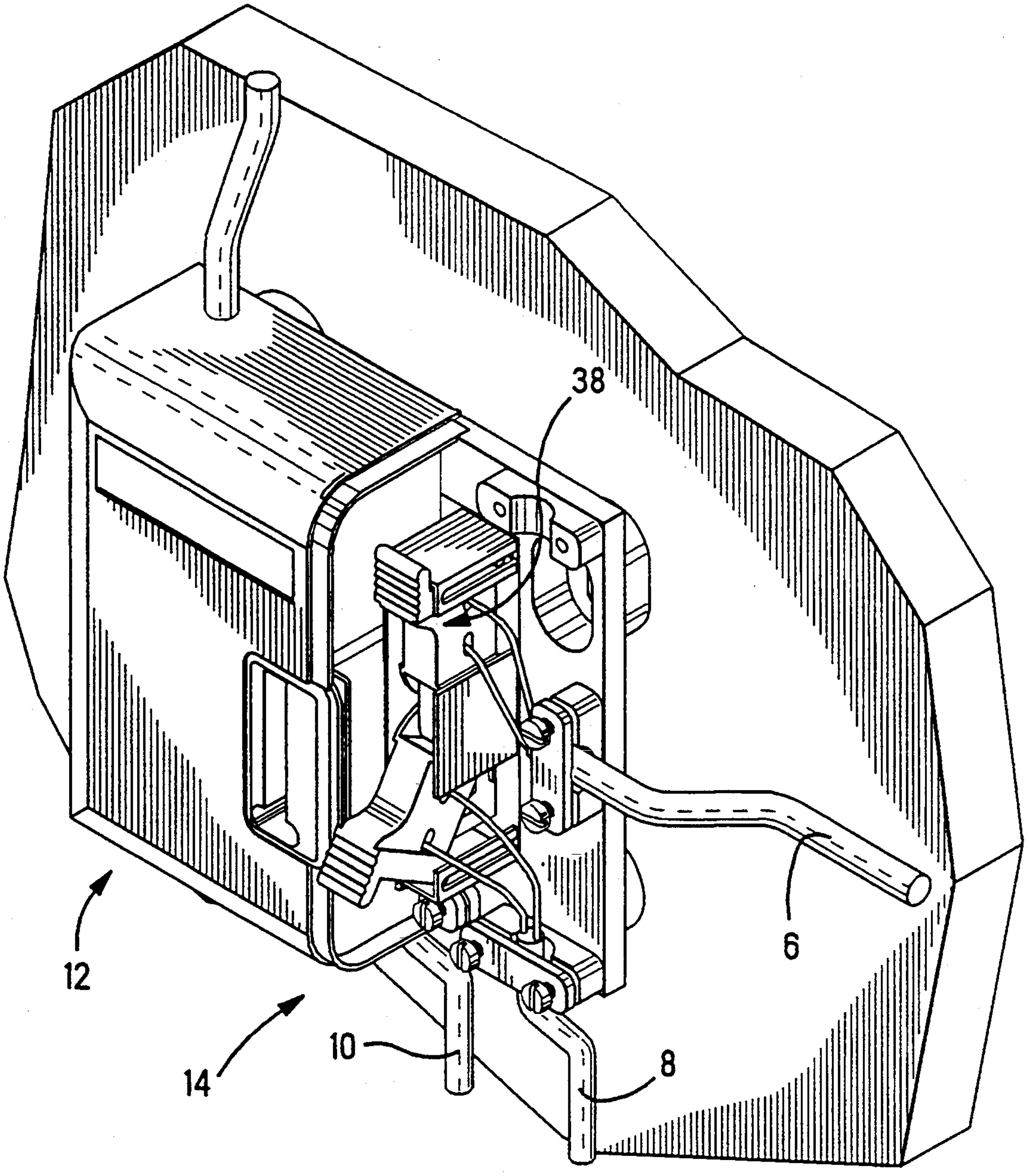
FIG. 11 is an isometric view of a subscriber box with the subscriber side cover taken off and showing subscriber lines being connected thereto.
Figure 12A:
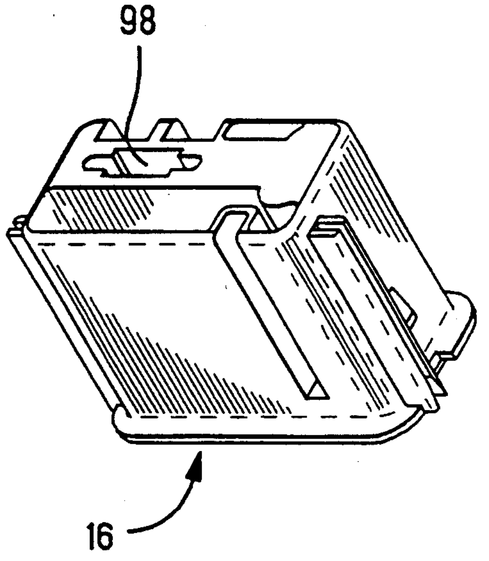
FIGS. 12*a* to 12*d* show different views of a test socket.
Figure 12B:
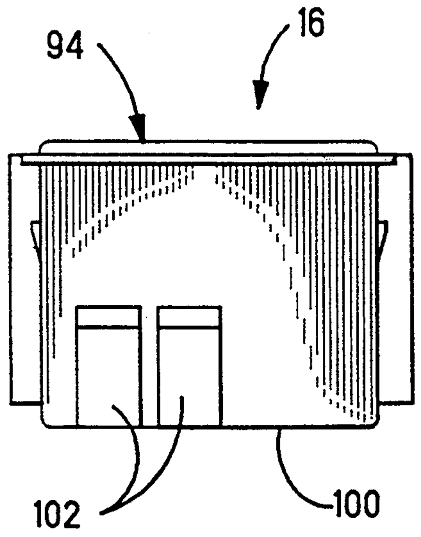
Figure 12C:
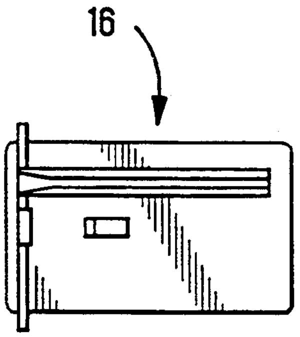
Figure 12D:
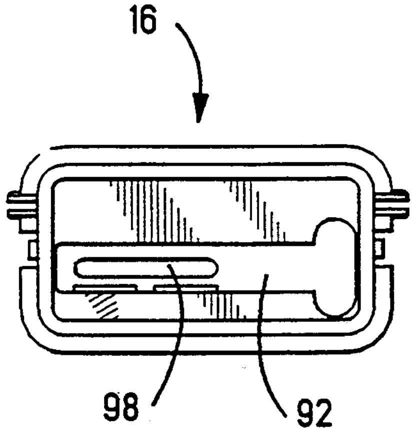

Referring now to FIG. 11, the subscriber cables 6 and 8 are connected in a very similar manner to the terminals 120 with the lever members 38. Due to the need for more than one subscriber line, the lever members 38 have two wire receiving cavities 72,74, each for receiving one wire of the pair of wires that form a subscriber cable 6 or 8. The terminals 120 (FIG. 15) have IDC contact portions 122 that project into corresponding slots 76,78 of the lever members 38 (FIG. 10) whereby the terminals 121,123 of the pair of terminals 120 are staggered such that the IDC contact portion 122 that is in the slot 76 is positioned adjacent the wire receiving cavity 74, and the IDC contact portion 122 that is in the slot 78 is positioned adjacent the wire receiving cavity 72. As can be seen in the electrical schema of FIG. 2 and by the terminals shown in FIG. 15, electrical wires of the subscriber cables 6 and 8 having the same pole are electrically connected to the same terminal 121 or 123, in other words the cables 6 and 8 are connected in parallel to the network cable 4.

Now referring to FIG. 13, the terminals 120 make electrical contact to the terminals 130 by the V-shaped contact protrusion 128 that is resiliently biased against the base 132 of the terminals 130. The resilient arms 126 of the terminals 120 extend from the lever members 38 on the subscriber side to the terminals 130 on the network side by passing underneath the test socket 16. The individual terminals 121,123 of the pair of subscriber terminals 120 each electrically contact a corresponding terminal 131 or 133 of the pair of terminals 130 (FIG. 16).

Referring to FIGS. 13 and 14, the functioning of the test socket will now be explained. During normal use of the subscriber interface box, the insert 104 is loosely positioned against the resilient arms 126 of the pair of terminals 120. The insert 104 is wide enough to span both of the resilient arms 126. When a test plug 110 is inserted into the plug receiving cavity 92, the test plug abuts the insert head 106 thereby pushing the insert against the resilient arms 126 of the contact such that they are biased downwards thus moving the contact projections 128 out of electrical contact with the terminals 130. Simultaneously, insertion of the plug 110 into the cavity 92, causes the test socket contact portion 136 of the terminals 130 to be resiliently biased away from the cavity 92, the contact portion 136 normally projecting into the test socket cavity area 92 in a free standing position. The test socket 110 reaches the fully inserted position when the arcuate contact portion 136 engages in a corresponding recess 111 of the test socket, the contact portion 136 not only making electrical contact with terminals (not shown) of the test socket but also provisionally holding the test socket in the fully inserted position. In the latter position, the test socket 110 is thus electrically connected to the terminals 130 and therefore to the network cable 4, whereby the contacts 120 are electrically disconnected to the network terminals 130. Removal of the plug 110 from the test socket 16 will cause the resilient arms 126 to bias upwards and re-enter contact with the terminals 130 thus re-establishing electrical contact between the subscriber cables 6,8 and the network cable 4.

The terminals 130 further have the forked contacts 138 and 140 (FIG. 16) which serve to make electrical contact with respectively the surge protector 54 and the RC-module 56. The contacts 138 upstand from the base 28 in a substantially vertical manner and the surge protector 54 comprises tabs spaced apart so as to be insertable into, and mate with the pair of contacts 138. The surge protector 54, further comprises a centrally positioned grounding tab that is insertable into the contact 152 of the grounding terminal 150, whereby the contact portion 152 of the grounding terminal 150 is also upstanding from the base 28 and positioned centrally between the pair of terminals 138 for receiving the surge protector grounding tab. The frame 44 comprises upstanding walls 45 that mate substantially closely to the cavity in the surge protector for correct positioning thereof with respect to the contacts 138, 152 such that the surge protector tabs can be mated therewith by simply inserting the surge protector 54 over the upstanding walls 84 of the supporting frame 44.

Stiff wires of the RC-module 56 mate directly with the pair of forked contacts 140 of the terminals 130, this connection being very similar to an IDC connection and allows the RC-module to be produced simply with wire terminals. In this disposition, the surge protector 54 and the RC-module 56 are both electrically connected to the network cable 4 and via the terminals 120 connected to the subscriber cable 6 and 8 whilst no test plug is inserted in the cavity 92 of the test socket 16. The grounding terminal 150 (FIG. 17) is shaped such that it bends around the test socket and projects a contact arm 156 below the grounding block 52 such that a grounding wire can be placed below the contact arm 156, and electrical contact made therewith by clamping down the contact arm 156 onto the grounding wire with screw means 53 (FIG. 4).

Figure 18:
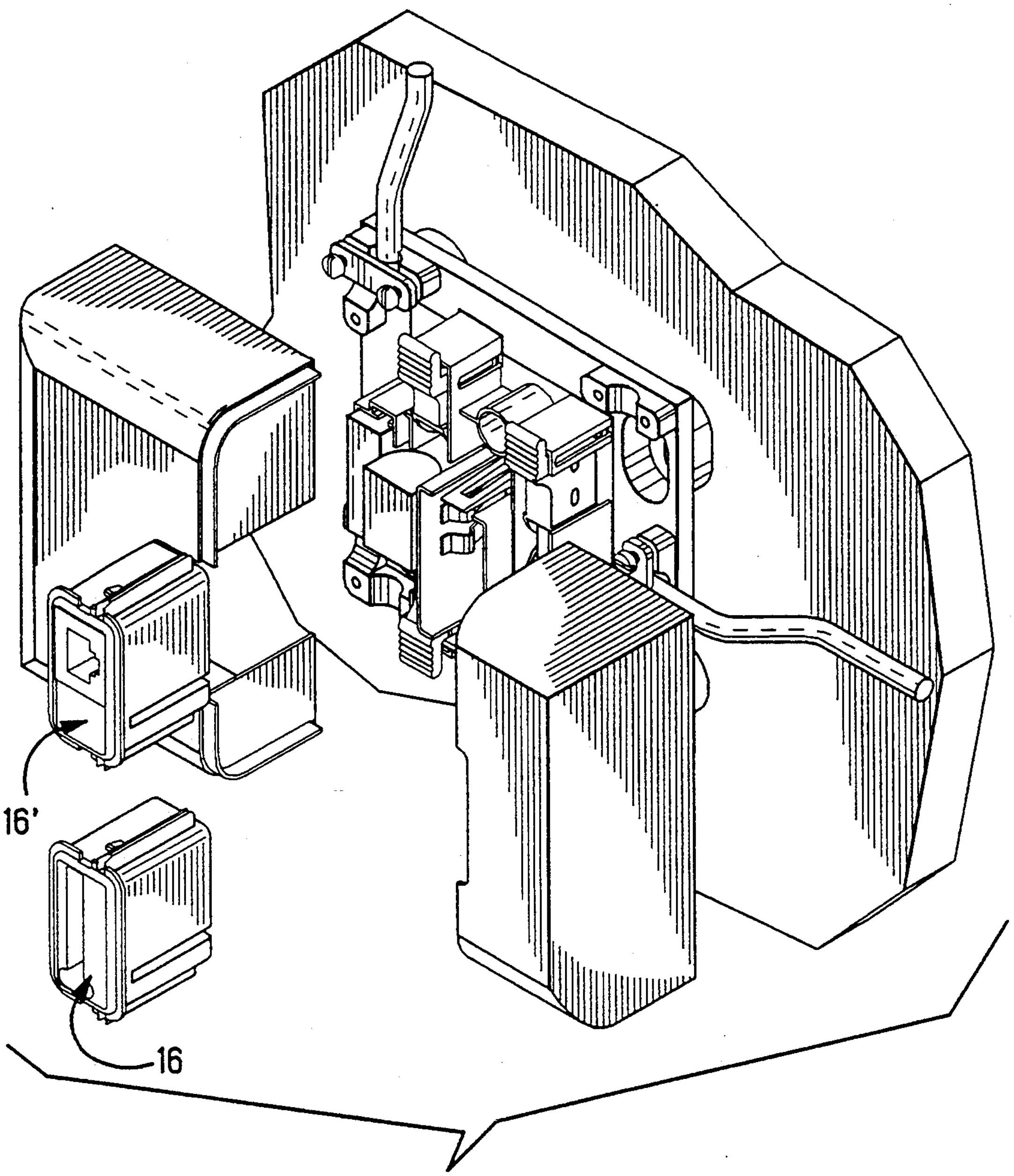
FIG. 18 is an isometric view of the subscriber interface box showing replacement of the test socket by another test socket.
Figure 19:
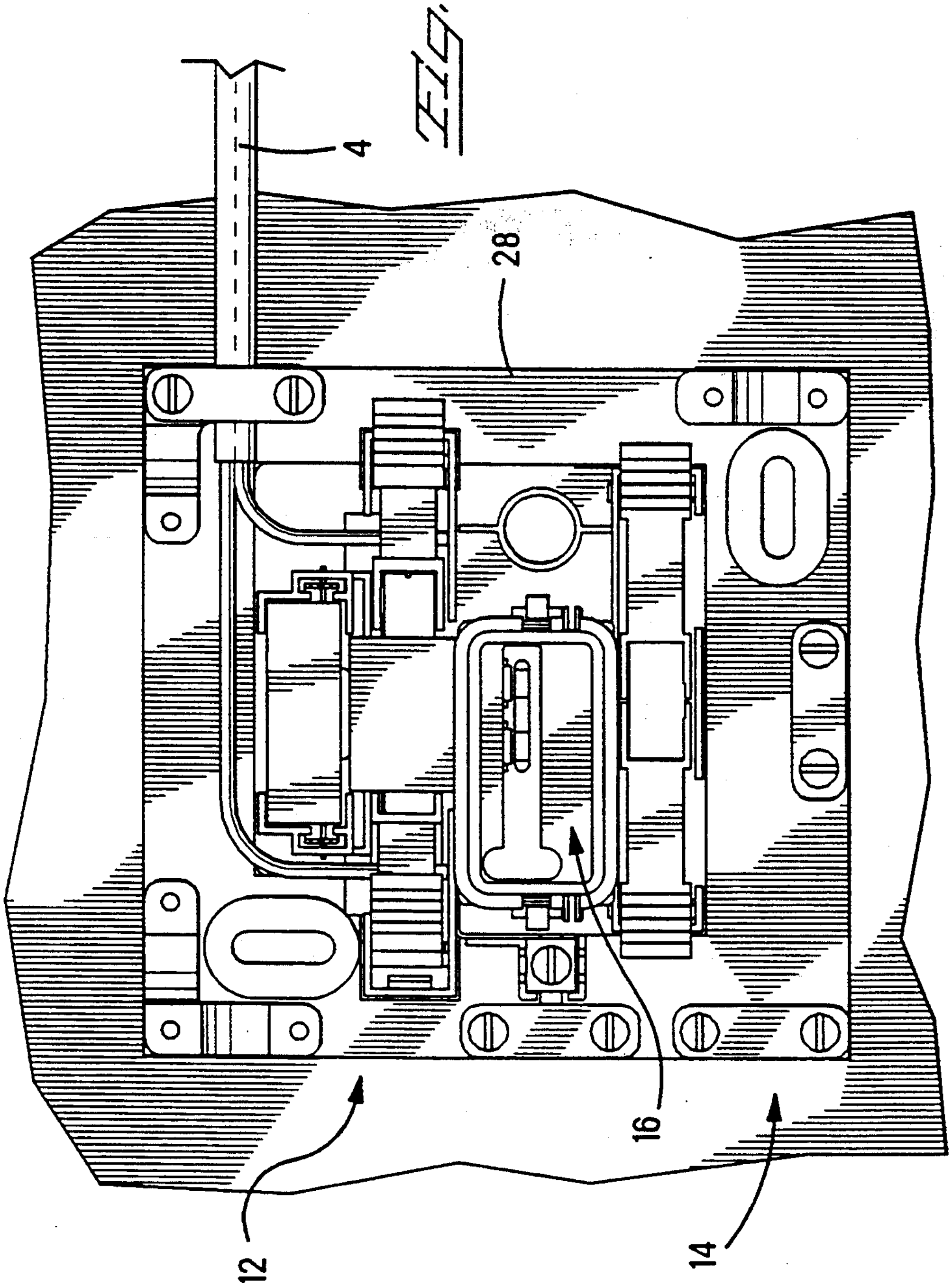
FIG. 19 is the top view of the subscriber interface box with cover means removed.

Advantageously therefore, the network and the subscriber cables can be rapidly and easily connected and disconnected to their corresponding terminals. Further, the network section and the subscriber section are separate and terminals can be connected and disconnected from either the subscriber or the network side without one influencing the other, the cover member being split into two parts such that access to the subscriber section can be made independently without removing the cover 26 on the network section. Yet advantageously is the simple means to disconnect the subscriber from the network side when inserting a test plug into the test socket, and further the test socket 16 is modular and can be easily replaced (see FIG. 18) by a different test socket 16' if needed. Yet advantageously is a cost effective design of the terminals 120, 130 which are unitary parts stamped and formed from sheet metal, whereby the terminal 130 for example, integrally incorporates a test socket contact portion 136, a surge protector contact portion 138, a wire connecting portion 142 and an RC-module contacting portion 140.

We claim:

1. A subscriber interface box for making electrical connection between a network cable and subscriber cables comprising a base, a subscriber section, a network section, a test socket for receiving a testing apparatus plug, and terminals, whereby the terminals electrically connect the network section to the subscriber section via the test socket such that insertion of the testing apparatus plug into the test socket electrically disconnects the network section from the subscriber section and electrically connects the testing apparatus to the network section, the terminals having insulation displacing contact (IDC) sections for connection to the subscriber or network cables, the interface box further comprising movable stuffer levers having cavities that receive the cables for connecting and disconnecting of the cables to the IDC sections.

2. The subscriber interface box of claim 1 characterized in that some of the terminals have a resilient contact portion whereby insertion of the testing apparatus plug into the test socket resiliently biases these contacts to electrically disconnect the subscriber from the network section.

3. The subscriber interface box of claim 2 characterized in that the test socket comprises a plug receiving cavity and a disconnection insert cavity that extends from the plug receiving cavity to a position adjacent the resilient contact portion, the disconnection insert cavity for receiving a slidable insert that can project through the cavity and abut the resilient contacts for resilient biasing thereof during insertion of the plug into the plug receiving cavity.

4. The subscriber interface box of any of the preceding claims characterized in that the test socket is mounted to the base via resilient latch means such that the test socket is rapidly replaceable by another test socket.

5. The subscriber interface box of claim 1 wherein the movable stuffer levers have slots transversely intersecting the cavities for receiving insulation displacement contacts of the terminals, the cavities being movable substantially adjacent to slots of the contacts by manual activation of the levers such that the wires fully inserted in the cavities can be pushed into the contact slots for electrical connection therewith, respectively pulled out of the contact slots for electrical disconnection therewith.

6. The subscriber interface box of claim 5 wherein the lever comprises a grip extending therefrom for moving the lever by hand without use of a tool.

7. The subscriber interface box of claim 5 wherein the stuffer lever has a pivot member close to one end thereof and rotatably attached to a lever mounting frame which is in a fixed relation to the insulation displacement contacts, for pivot movement of the stuffer lever while connecting or disconnecting the cables to the IDC sections.

8. The subscriber interface box of claim 1 wherein the stuffer levers of the subscriber section comprise a plurality of wire receiving cavities for connecting to a plurality of electrical wires of the subscriber cables.

9. The subscriber interface box of claim 8 wherein the subscriber stuffer levers have a corresponding number of slots for receiving a plurality of IDC sections therein.

10. The subscriber interface box of claim 1 wherein the terminals of the network section integrally comprise a test socket contact portion, network wire connecting portions, and electrical component contacting portions for connection to electrical components such as a surge protector and RC module.

11. The subscriber interface box of claim 10 wherein the terminals are stamped and formed from sheet metal.

12. The subscriber interface box of claim 10 wherein the connecting and contacting portions upstand in a substantially orthogonal direction from a base portion that extends from the network IDC section to the test socket, such that the electrical components are insertable thereover for connection thereto.

13. The subscriber interface box of claim 1 wherein the box comprises a cover that is split into two parts positionable respectively over the subscriber and network sections, the subscriber section cover part being independently removable for access to the subscriber section.

14. The subscriber interface box of claim 7 wherein the lever mounting frame comprises hooked shaped pivot bearings that rotatably hold the lever pivot members thereto.

15. A subscriber interface box for making electrical connection between a network cable and subscriber cables comprising a base, a subscriber section, a network section, a test socket for receiving a testing apparatus plug, and terminals, whereby the terminals electrically connect the network section to the subscriber section via the test socket such that insertion of the testing apparatus plug into the test socket electrically disconnects the network section from the subscriber section and electrically connects the testing apparatus to the network section, wherein the test socket is mounted to the base via resilient latch means such that the test socket is rapidly replaceable by another test socket.

16. The subscriber interface box of claim 15 wherein the test socket comprises a plug receiving cavity and a disconnection insert cavity that extends from the plug receiving cavity to a position adjacent the resilient contact portion, the disconnection insert cavity receives a slidable insert that can project through the cavity and abut the resilient contacts for resilient biasing thereof during insertion of the plug into the plug receiving cavity.

* * * * *